(12) United States Patent
Walker

(10) Patent No.: US 8,485,451 B2
(45) Date of Patent: Jul. 16, 2013

(54) METHOD AND SYSTEM FOR GENERATING A VISUAL KEY

(75) Inventor: Matthew Walker, Queensland (AU)

(73) Assignee: Asia Capital Services Limited (CN)

( * ) Notice: Subject to any disclaimer, the term of this patent is extended or adjusted under 35 U.S.C. 154(b) by 0 days.

(21) Appl. No.: 13/380,093

(22) PCT Filed: Jun. 23, 2010

(86) PCT No.: PCT/AU2010/000791
§ 371 (c)(1),
(2), (4) Date: Mar. 12, 2012

(87) PCT Pub. No.: WO2010/148448
PCT Pub. Date: Dec. 29, 2010

(65) Prior Publication Data
US 2012/0162231 A1  Jun. 28, 2012

(30) Foreign Application Priority Data

Jun. 24, 2009 (AU) .............................. 2009902922

(51) Int. Cl.
*G06T 11/00* (2006.01)
(52) U.S. Cl.
USPC ........................... 235/494; 235/380; 235/382
(58) Field of Classification Search
USPC .. 235/380, 382, 435, 457, 487, 494; 713/189, 713/190
See application file for complete search history.

(56) References Cited

U.S. PATENT DOCUMENTS

| | | | |
|---|---|---|---|
| 4,921,278 A * | 5/1990 | Shiang et al. | 283/87 |
| 4,991,205 A * | 2/1991 | Lemelson | 713/186 |
| 6,249,588 B1 * | 6/2001 | Amidror et al. | 382/100 |
| 7,181,433 B2 * | 2/2007 | Yousofi | 705/67 |
| 7,997,503 B2 | 8/2011 | Walker | |
| 2005/0044395 A1 * | 2/2005 | Staring et al. | 713/200 |
| 2005/0117748 A1 * | 6/2005 | Schrijen et al. | 380/200 |
| 2006/0018467 A1 * | 1/2006 | Steinmetz | 380/54 |
| 2006/0020559 A1 * | 1/2006 | Steinmetz | 705/67 |
| 2006/0031174 A1 * | 2/2006 | Steinmetz | 705/67 |

FOREIGN PATENT DOCUMENTS

| | | |
|---|---|---|
| GB | 2458985 | 10/2009 |
| WO | 0217556 | 2/2002 |
| WO | 03060674 | 7/2003 |
| WO | 2008028215 | 3/2008 |

OTHER PUBLICATIONS

International Search Report for PCT/AU2010/000791, Completed by the Australian Patent Office on Aug. 4, 2010, 4 Pages.

(Continued)

*Primary Examiner* — Thien M Le
*Assistant Examiner* — Abdullah Eid
(74) *Attorney, Agent, or Firm* — Brooks Kushman P.C.

(57) ABSTRACT

A method and system for generating a visual key enables improved security and user-friendliness in defining a humanly readable visual code of characters. The method includes generating a random or pseudo random first arrangement of a plurality of symbols. An analysis is then conducted of the first arrangement to determine that no character of a predetermined character set is defined by the first arrangement. Next, an analysis is conducted of the first arrangement to determine that characters of the predetermined character set can be generated when the first arrangement is aligned with a second arrangement of a plurality of the symbols. A determination is then made, based on the above analyses, that the first arrangement is acceptable as a visual key.

20 Claims, 9 Drawing Sheets

OTHER PUBLICATIONS http://en.wikipedia.org/wiki/PassWindow, Retrieved on Oct. 25, 2012, "PassWindow", 4 Pages.

http://www.passwindow.com/implementation.html, Retrieved on Oct. 25, 2012, "How do I implement PassWindow." 3 Pages.

http://vest.fr_PassWidnow_Analysis.pdf, Retrived on Oct. 25, 2012, Nettle et al. "PassWidnow: A New Solution to Providing Second Factor Authentication." 14 Pages.

* cited by examiner

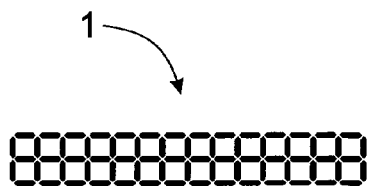
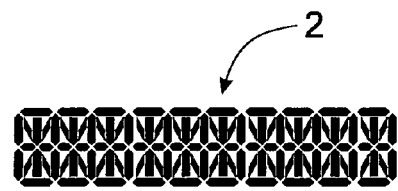
FIG. 1          FIG. 1A
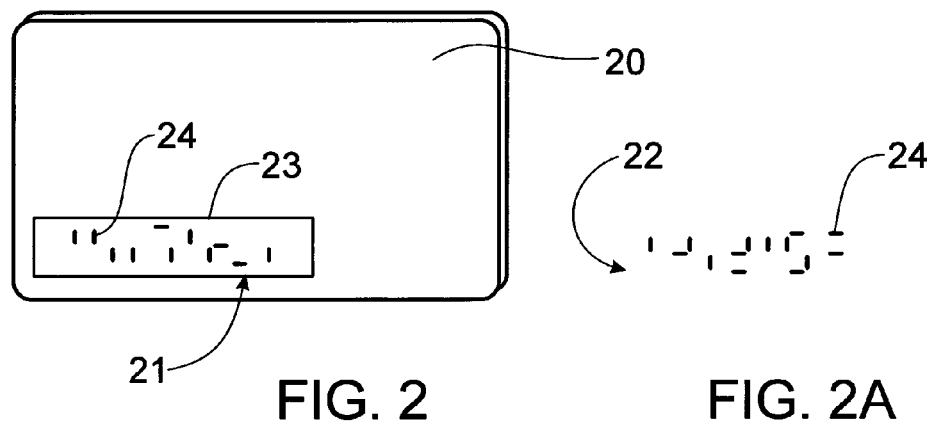
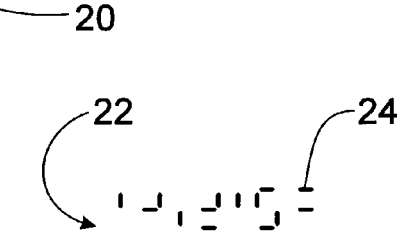
FIG. 2          FIG. 2A
FIG. 2B
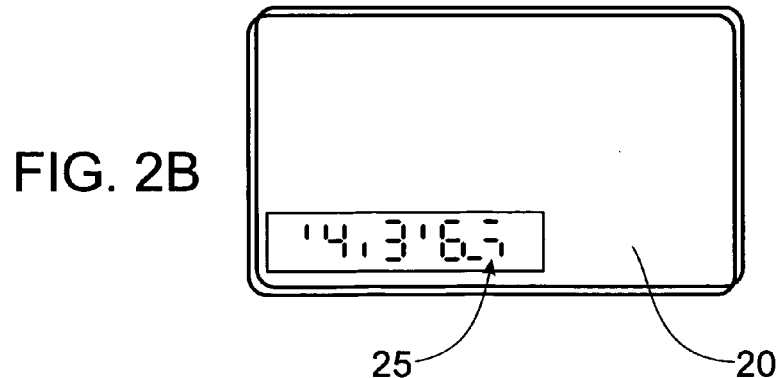
(PRIOR ART)

METHOD AND SYSTEM FOR GENERATING A VISUAL KEY

CROSS-REFERENCE TO RELATED APPLICATION

This application is the U.S. national phase of PCT Appln. No. PCT/AU2010/000791 filed Jun. 23, 2010 which claims priority to Australian application 2009902922 filed Jun. 24, 2009, the disclosures of which are incorporated in their entirety by reference herein.

FIELD OF THE INVENTION

The present invention relates generally to electronic network authentication processes. In particular, although not exclusively, the invention relates to a method and system for generating a visual key having improved security features.

BACKGROUND TO THE INVENTION

The increasing use of transaction verification throughout the world is exhibited in the credit card, bank card and other card payment systems being used commonly in grocery stores, banks, universities and on Internet websites. A prevalent problem with remote payment card systems has been remote transaction verification. A primary system of transaction verification security involves a user's signature, which for example may be signed onto a sales receipt. However, apart from the obvious problem of easily forged signatures, such a signature system is not readily adaptable to modern remote electronic transactions, such as transactions over the Internet.

An early remote electronic verification method involved a basic Luhn algorithm to generate unique card numbers in a non sequential manner, which numbers were then verified by testing them against the algorithm. The method was not intended to be cryptographically secure, as it protected only against accidental error and not malicious attacks. This basic method of verification became increasingly invalid with the advent of the Internet, as fraud increased and details of the algorithm became widespread.

Today, half of all credit card fraud is conducted online. In response to this widespread fraud, credit card companies have implemented a static CVV (Card Verification Value) printed on the back or front of cards at time of issue. The CVV, usually a three or four digit number, is required to be entered at the time of transaction, particularly with online payment. A disadvantage of the CVV number system is that many modern credit card fraud systems use card details including a static CVV number gained from hacking online shopping payment databases, phishing techniques or screen and keylogging programs installed on a victim's computer system. Obviously, a major drawback to the CVV number system is the static nature of the printed numbers, which mean that once card details including a CVV are compromised a victim can be easily defrauded repeatedly. Furthermore, the simple static nature of the CVV number system method offers little proof that a remote user actually has the physical card in their possession, as this simple three or four digit number easily can be shared along with other card details. In response to the security weaknesses of CVV number systems, some banks have begun issuing members with a one-time, password-generating electronic device known as a hardware token. These devices have a small screen and button which, when pressed, generates a one-time, dynamically changing password using encrypted secret key programming. A password code is generally changed every minute or so. Disadvantages of this system include the enormous expense of buying and issuing these electronic devices that must be secured from the factory of manufacture, battery maintenance, electronic fragility, inability to carry inside conventional wallets, separation from corresponding identification cards, and internal clock synchronization that is necessary with a remote server.

Smart Card technology has also been proposed for use in secure verification methods. Such technology has not become widely used, however, due to issues of remote infrastructure cost and availability, electronic cloning, cost of cards with integrated circuits, and the fragility of the card circuits under conditions of day to day use.

Proximity cards used as a payment system in some transportation services have also been proposed. Apart from suffering from the same problems as smart card systems, proximity cards also have the added security issue of a potential unauthorized third party cloning or charging the card at a distance.

There is therefore a need for an improved, secure, dynamically manipulable password transaction verification system. International patent application no. PCT/AU2006/002013, titled "Method and Device for Visual Code Transaction Verification", described such a system for the first time. The international patent application was filed 31 Dec. 2006 and published as WO 2008/028215. The system avoids the associated remote infrastructure costs and electronic security vulnerabilities of the prior art.

OBJECTS OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

Accordingly, in one form, the present invention is a method for generating a visual key, the method comprising:

generating a random or pseudo random first arrangement of a plurality of symbols;

conducting an analysis of the first arrangement to determine that no character of a predetermined character set is defined by the first arrangement;

conducting an analysis of the first arrangement to determine that no characters of the predetermined character set can be generated when the first arrangement is aligned with a second arrangement of a plurality of the symbols; and determining, based on the above analyses, that the first arrangement is acceptable as a visual key.

Optionally, the plurality of symbols comprises a plurality of identical symbols.

Optionally, the symbols comprise elongated segments.

Optionally, the first arrangement of the plurality of symbols is printed on a transparent window of a card, the second arrangement of the plurality of symbols is displayed on an electronic display screen, and aligning the first arrangement with the second arrangement comprises superimposing the first arrangement over the second arrangement.

Optionally, the first arrangement is displayed on an electronic display screen, the second arrangement of the plurality of symbols is printed on a transparent window of a card, and aligning the first arrangement with the second arrangement comprises superimposing the second arrangement over the first arrangement.

Optionally, conducting an analysis of the first arrangement to determine that characters of the predetermined character set can be generated comprises conducting an analysis of the first arrangement to determine that all characters of the predetermined character set can be generated.

Optionally, conducting an analysis of the first arrangement to determine that characters of the predetermined character set can be generated comprises conducting an analysis of the first arrangement to determine that a subset of characters of the predetermined character set can be generated.

Optionally, the predetermined character set is an alphanumeric character set.

Optionally, generating the random or pseudo random first arrangement of the plurality of symbols comprises including a number, within a predetermined range, of symbols to satisfy a predetermined pattern density range.

Optionally, the method further comprises adding obfuscation symbols to the first arrangement to increase the cryptographic effectiveness of the visual key.

According to another form, an embodiment of the present invention comprises a computer server for generating a visual key, where the server includes a processor and a memory operatively coupled to the processor. The memory then includes computer readable program code components for executing the above described method.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which:

FIG. 1 is a pictorial view showing a basic elongated segment grid pattern with all possible segments filled, as known according to the prior art.

FIG. 1A is a pictorial view showing a more complex elongated segment grid pattern with diagonal elongated segments capable of depicting 14 segment characters, as known according to the prior art.

FIG. 2 is a pictorial view of an opaque conventional plastic identification card with a transparent window and an example of a static elongated segment pattern printed thereon, as known according to the prior art.

FIG. 2A is a pictorial view of a synchronized elongated segment pattern as shown on a typical electronic display screen, as known according to the prior art.

FIG. 2B is a pictorial view of the conventional plastic identification card with its static elongated segment pattern superimposed over a synchronized elongated segment pattern, as known according to the prior art.

DETAILED DESCRIPTION OF THE INVENTION

Figure 3:
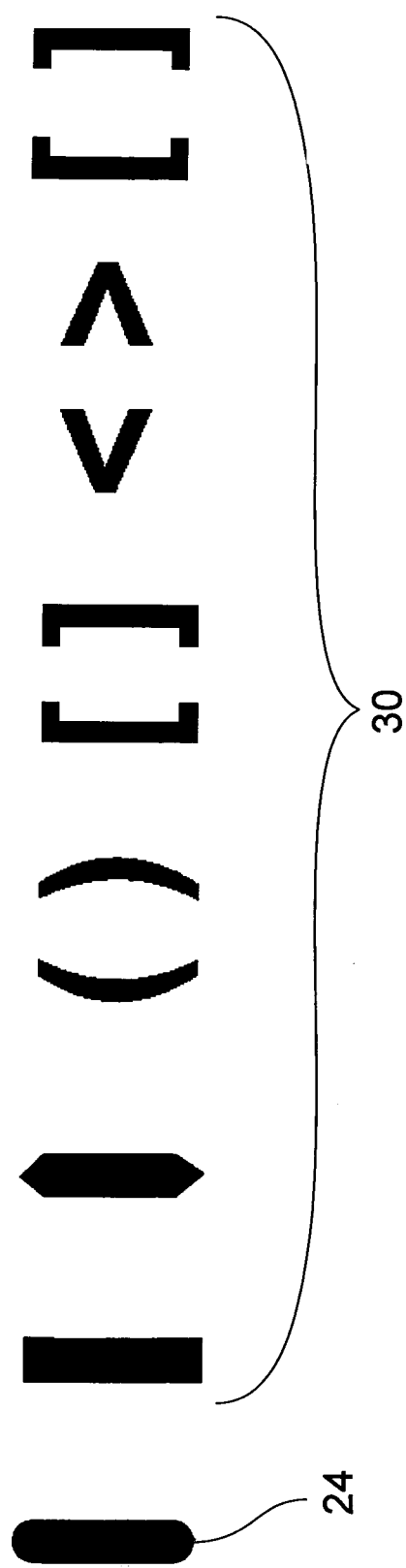
FIG. 3 illustrates various samples of alternative symbols that can be used to define a code, according to some embodiments of the present invention.

The present invention relates to a method of generating a more cryptographically secure and user-friendly visual key for use in defining a humanly readable visual code of characters. The code can be used as a one time authentication code during an electronic transaction verification process.

In this patent specification, adjectives such as first and second, left and right, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

As further background, FIGS. 1, 2, 2A and 2B illustrate the prior art process of generating a humanly readable visual code of characters for use as a one time visual code, as described in International patent application no. PCT/AU2006/002013, titled "Method and Device for Visual Code Transaction Verification" (published as international publication no. WO 2008/028215).

FIG. 1 is a pictorial view showing a basic elongated segment grid pattern 1 with all possible segments filled, as known according to the prior art. FIG. 1A is a pictorial view showing a more complex elongated segment grid pattern 2 with diagonal elongated segments capable of depicting 14 segment characters.

FIG. 2 is a pictorial view of an opaque conventional plastic identification card 20 with a transparent window 23 and an example of a static elongated segment pattern 21 printed thereon. FIG. 2A is a pictorial view of a synchronized elongated segment pattern 22 as shown on a typical electronic display screen. FIG. 2B is a pictorial view of the conventional plastic identification card 20 with its static elongated segment pattern 21 superimposed over the synchronized elongated segment pattern 22, revealing a three digit segmented dynamic visual code 25 consisting of the characters "4 3 6".

The static elongated segment pattern 21 may comprise elongated segments 24 printed on the transparent window 23. In a preferred embodiment the elongated segments 24 are straight, some of the elongated segments 24 are parallel to each other and some of the elongated segments 24 are perpendicular to each other. The elongated segments 24 are printed on a transparent section of the card 20 in the form of the transparent window 23 in a uniformly random grid pattern such as the static elongated segment pattern 21. The transparent window 23 can be placed in any location on the card 20 and be of variable size to suit the dimensions of the pattern used.

During use of the identification card 20, a user identifies himself or herself to a server application that locates in a memory a definition of the user's pre-recorded static elongated segment pattern 21, and is then able to generate a corresponding challenge pattern in the form of the synchronized elongated segment pattern 22. When the user's static elongated segment pattern 21 is correctly superimposed over the synchronized elongated segment pattern 22, the specific humanly readable visual code 25 (e.g., consisting of the characters "4 3 6") becomes apparent to the user. The visual code 25 then can be used as a one time password for secure transaction verification.

The user's static elongated segment pattern 21 is digitally recorded at the time of manufacture of the card 20 and is stored on a secure authenticating server connected to a network. The generation of both the user's static elongated segment pattern 21 and the synchronized elongated segment pattern 22 can be performed under predetermined conditions. A human comprehension of the dynamic visual code 25 may be based on a uniformly random arrangement of the elongated segments 24 that make up the user's static elongated segment pattern 21. The elongated segments 24 can be displayed in a somewhat evenly distributed fashion for maximum flexibility of possible character generation and to avoid the generation of false characters or obstructing identification of visual characters. Also, the synchronized elongated segment pattern 22 can be seeded with false segmented patterns designed to make visual analysis of individual patterns more difficult, while still displaying the correct visual code 25 to the user when the synchronized elongated segment pattern 22 is electronically displayed and correctly aligned with the user's static elongated segment pattern 21. According to some embodiments of the present invention, a segmented pattern or visual key generation application primarily balances user readability and ease of visual alignment of patterns with the need for security against visual analysis of the patterns.

A grid pattern such as the basic elongated segment grid pattern 1 having a variable number of rows and columns made of elongated segments 24, can be used as a baseline alignment pattern for a visual code. While the basic elongated segment grid pattern 1 enables seven segment display characters to be generated anywhere within a seven segment section, by adding alternating elongated diagonal segments between the vertical and horizontal segments, as shown in the complex elongated segment grid pattern 2, more complex fourteen segment display characters can be produced. Individual segments, such as the elongated segments 24, can be either dark, light, transparent, colored or shaded in more complex versions of the same method. Each individual segment can be either darkened or transparent on a user's card or can be dark or light on a synchronized elongated segment pattern. The size and proportions of a segmented baseline grid can be roughly the same dimensions for both segmented patterns, and the synchronized elongated segment pattern 22 can be adjusted through simple graphic manipulation. More complex visual patterns can utilize shaded segments which when superimposed with other shaded segments produce stronger visual character segments while providing more pattern noise for added complexity and protection against pattern analysis.

The individual horizontal and vertical elongated segments 24 can be of varying length, width and height. The dimensions are easily adjustable according to the user's ease of visibility, readability, contrast, background light and ease of physical alignment over various electronic screen resolutions and screen surfaces. Different resolutions of various electronic screens displaying the synchronized elongated segment pattern 22 can be problematic with relation to displaying the synchronized elongated segment pattern 22 with a similar proportional dimension to the user's static elongated segment pattern 21 to facilitate correct superimposed alignment of the elongated segments 24. However, as known by those having ordinary skill in the art, most online computer screen browsers provide simple detection scripts for screen resolution and easy image dimension adjustment. These dimension settings once detected can be stored for future use by the browser. The simple segmented character style of the visual code combined with surrounding areas of negative space assist user readability and character comprehension, despite possible slight variation between card and electronic screen pattern dimensions and resolutions.

Referring to FIG. 3, various samples are illustrated of alternative symbols 30, which can be used in place of the elongated segment 24, according to alternative embodiments of the present invention. The alternative symbols 30 can be used in various ways to define code characters. For example, the "[" and the "]" can be stacked on top of each other to define either the character "5" or the character "2".

Figure 4:
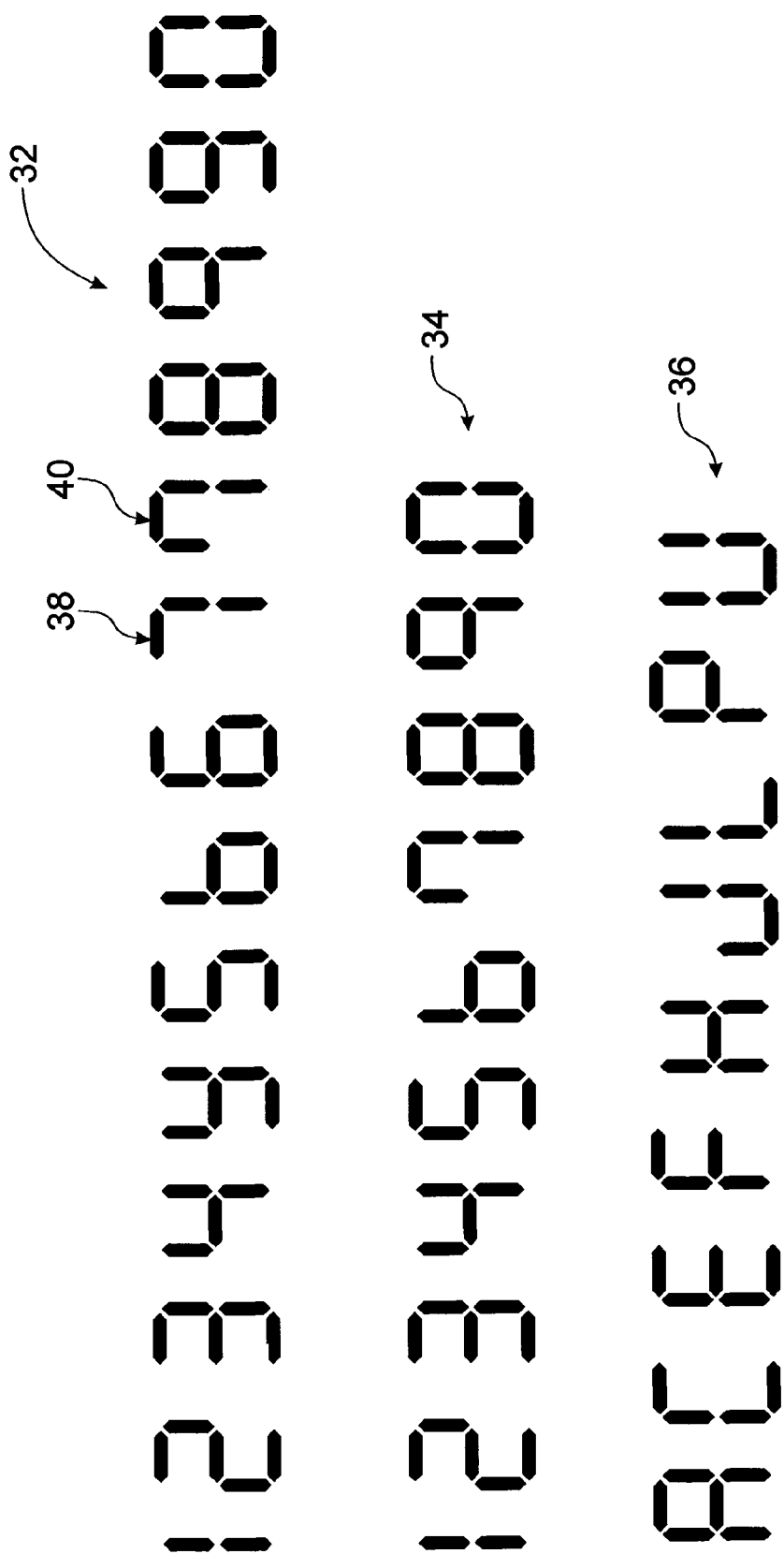
FIG. 4 illustrates three different character sets, according to some embodiments of the present invention.
Figure 5D:
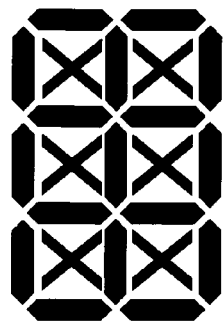
FIG. 5 illustrates example of various alternative patterns or grids that can be used to define characters, according to some embodiments of the present invention.
Figure 5E:
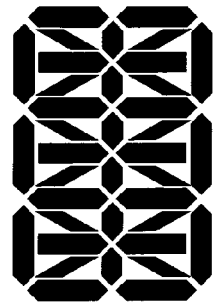
Figure 5A:
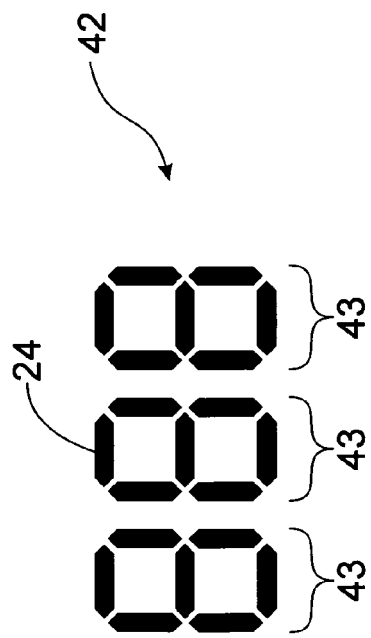
Figure 5B:
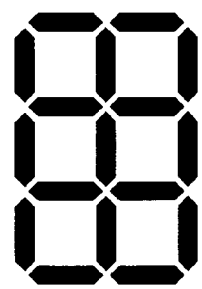
Figure 5C:
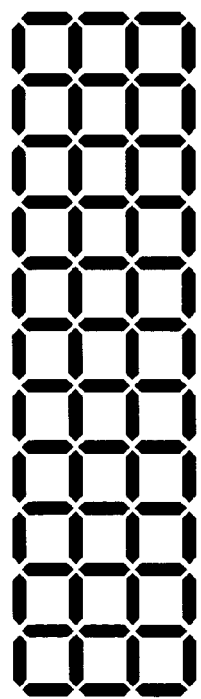

Referring to FIG. 4, three different character sets 32, 34, 36 are illustrated. As shown, the character set 32 includes multiple formats for some characters. For example, the character "7" can be defined using a combination of elongated segments 24 shown by reference numeral 38 or alternatively using a combination of elongated segments 24 shown by reference numeral 40. Those skilled in the art will appreciate that various other character sets are readily identifiable. For example, the character set 34 and the character set 36 can be combined to form an alphanumeric character set.

Referring to FIG. 5, examples are illustrated of various alternative patterns or grids that can be used to define characters. The alternative patterns or grids also define the available random or pseudo random arrangements of symbols that can be used to generate a visual key. For example, either a static elongated segment pattern 21 or a synchronized elongated segment pattern 22 can be defined by selecting only some of the segments 24 of the elongated segment grid pattern 42. The pattern 42 includes three character spaces 43, where each character space 43 can include up to seven segments 24, which when all used together define the character "8". Thus the grid pattern 42 is able to define three digit alphanumeric codes.

Figure 6:
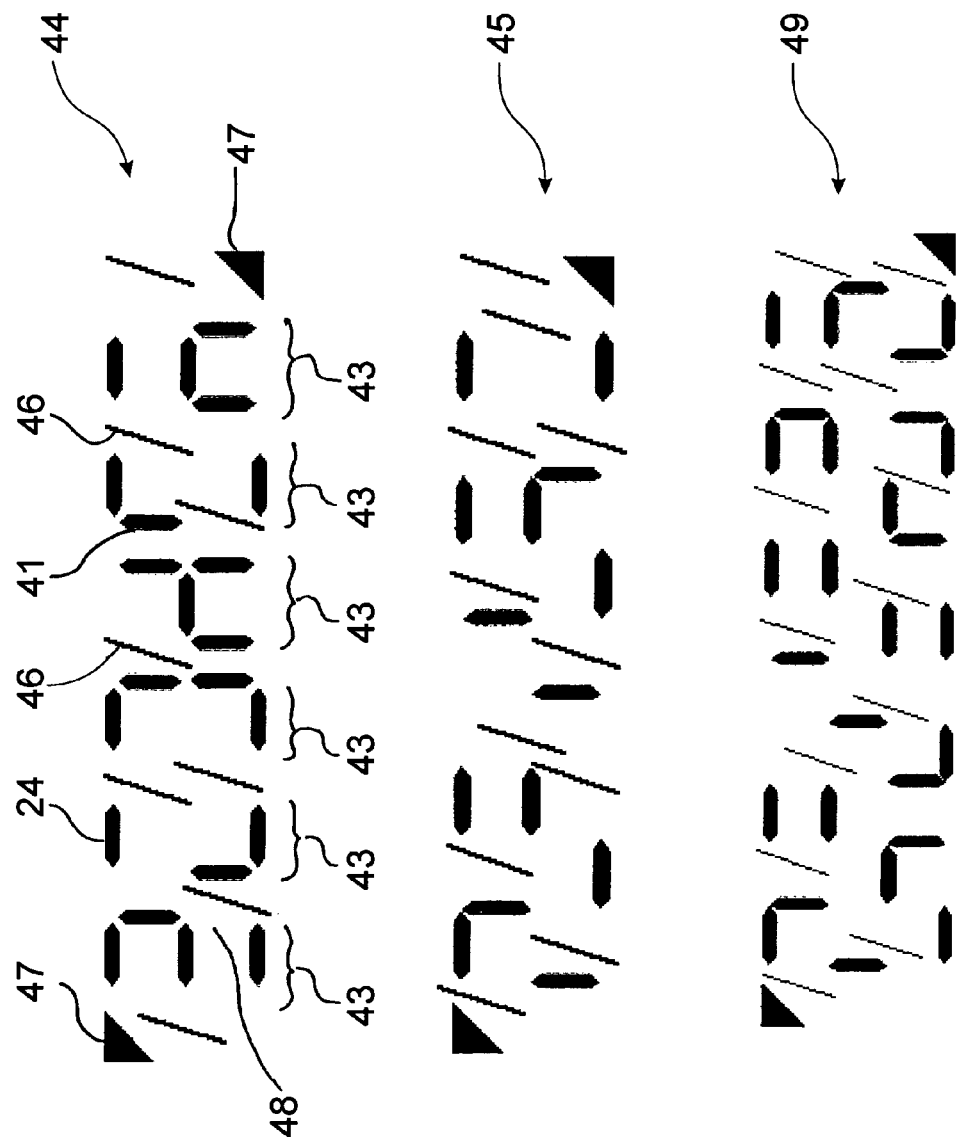
FIG. 6 is a pictorial view of a random or pseudo random arrangement of a plurality of symbols, according to some embodiments of the present invention.

Referring to FIG. 6, a pictorial view illustrates a random or pseudo random arrangement 44 of a plurality of symbols, according to some embodiments of the present invention. For example, the arrangement 44 can define either a static elongated segment pattern 21 or a synchronized elongated segment pattern 22. The lines 46 merely illustrate a partially reflective surface, such as the transparent window 23 of the plastic identification card 20 or the glass of an electronic display screen. The arrangement 44 also includes registration features 47 that can be used to assist in aligning the arrangement 44 with a either a corresponding static elongated segment pattern 21 or a corresponding synchronized elongated segment pattern 22.

According to some embodiments of the present invention, a method of generating a visual key includes first generating a random or pseudo random first arrangement, such as the arrangement 44, of a plurality of symbols. For example, in the arrangement 44 the symbols are the elongated segments 24. Other examples of random or pseudo random arrangements of a plurality of symbols include the arrangement 45 and the arrangement 49.

A method of generating a visual key next includes conducting an analysis of the first arrangement to determine that no character of a predetermined character set is defined by the first arrangement. For example, consider that a predetermined character set includes all of the alphanumeric characters included in the character sets 32, 36 shown in FIG. 4. As illustrated, none of the characters in the character sets 32, 36 are included in the arrangement 44. However, if for example an additional elongated segment 24 were displayed vertically at position 48, then the arrangement 44 would include the character "3" in the first character space 43. In that event, an analysis of the arrangement 44 would determine that at least one character of the predetermined character set (namely the sum of character sets 32, 36) is defined by the arrangement 44.

A predetermined character set may also include various arrangements of symbols that do not define an alpha-numeric character. For example, users of the card 20 may not like it and may find it distracting when using the card 20 if the static elongated segment pattern 21 defined a backwards letter "F". Therefore, when generating a visual key that will be defined by the static elongated segment pattern 21, an analysis may be performed to ensure that a backwards letter "F" is not defined by the pattern 21.

According to some embodiments of the present invention, a method of defining a visual key may next include conducting an analysis of the first arrangement to determine that characters of the predetermined character set can be generated when the first arrangement is aligned with a second arrangement of a plurality of the symbols. For example, if each of the six character spaces 43 in the arrangement 44 included an elongated segment 24 in the upper left vertical position 41, then the character "2" could not be defined in the arrangement 44. That is because the character "2" does not include an elongated segment 24 in the upper left vertical position 41 of a character space 43. Thus all of the characters in a predetermined character set that included the character "2" could not be generated when the arrangement 44 was aligned with a corresponding static elongated segment pattern 21 or synchronized elongated segment pattern 22.

If the above described analysis of the first arrangement determines that no character of a predetermined character set is defined by the first arrangement, and the above described analysis of the first arrangement determines that characters of the predetermined character set can be generated when the first arrangement is aligned with a second arrangement of a plurality of the symbols, then it is determined, based on the above analyses, that the first arrangement is acceptable as a visual key.

According to some embodiments of the present invention, generating the random or pseudo random first arrangement of the plurality of symbols may require including a number, within a predetermined range, of symbols to satisfy a predetermined pattern density range. A key pattern density is generally determined by the character set used. For example, if a character set includes only the character "1", a required pattern density is low; however, if a character set includes only the character "8", a required pattern density is high. So to define a number of symbols to satisfy a predetermined pattern density range, an overall character density per character is determined.

To improve security, a desired pattern density should be defined by a density range and not by a specific density value. That avoids a need to have a very specific amount of segments in a key, which would significantly limit the number of available keys. Also, with a specific density value, an attacker could make inferences about a character set for which a key was made.

An additional factor for determining an appropriate key pattern density concerns a relative ease of visualization, as characters are easier to see with the human eye with less noise. Thus a less dense key pattern in the static elongated segment patter 21 allows greater variation of the elongated segments 24 and easier visualization, although it also requires more obvious and less secure key challenges in the form of a corresponding synchronized elongated segment pattern 22. To determine character set visualization, manual review by groups of humans can be used to determine whether a particular arrangement of symbols subjectively appears to define a character. For example, users may not like and may find distracting particular arrangements of symbols, such as a backwards letter "F".

Figure 7:
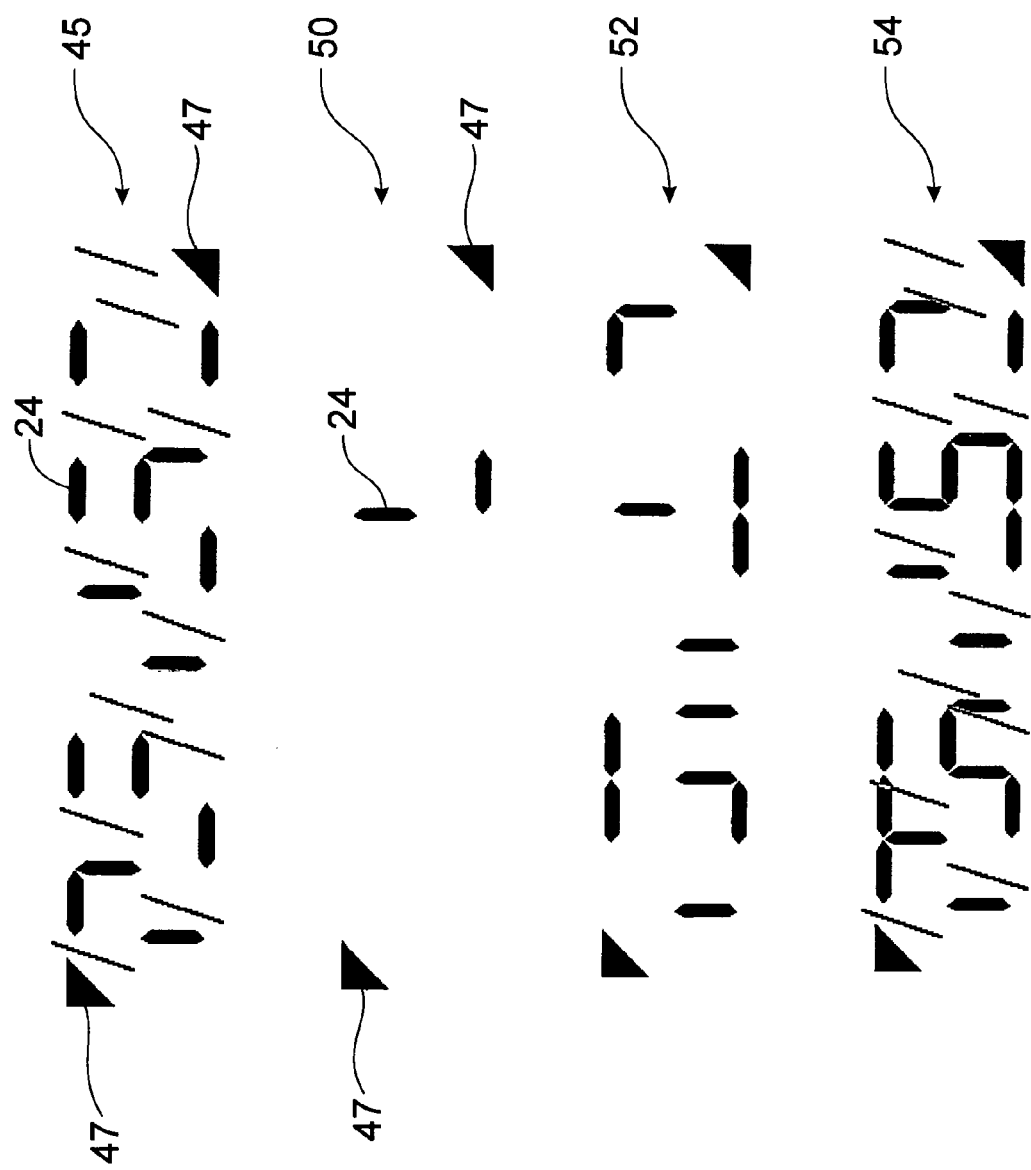
FIG. 7 is a diagram illustrating a process for adding obfuscation symbols to a first arrangement of symbols to increase the cryptographic effectiveness of a visual key, according to some embodiments of the present invention.

Referring to FIG. 7, a diagram illustrates a process for adding obfuscation symbols to a first arrangement of symbols to increase the cryptographic effectiveness of a visual key, according to an embodiment of the present invention. For example, the arrangement 45 of elongated symbols 24 can be used to generate a code consisting of the single character "5". To do so, a second arrangement 50 of symbols 24 is aligned with the arrangement 45 so that the registration features 47 of both arrangements 45, 50 overlap. However, the second arrangement 50 is not very cryptographically secure. If the second arrangement 50 is used as a synchronized elongated segment pattern 22, a malicious or unauthorised user such as a computer hacker can readily understand various facts about a corresponding code, including that the second arrangement 50 is used to define a key having only a single digit, that the digit is likely to be the character "5", and that the digit is at a particular horizontal position in the pattern 22.

Therefore, to increase security, obfuscation symbols can be added to an arrangement. For example, arrangement 52 shown in FIG. 7 illustrates various obfuscation symbols added to the arrangement 50. All of the elongated segments 24 in arrangement 52, except for the two segments 24 shown in arrangement 50, can be defined as obfuscation symbols. The obfuscation symbols do not define any part of a character of a code, but rather assist in hiding or masking other symbols that do define a part of a character of a code. When the arrangement 52 is aligned with the arrangement 45, a resulting arrangement 54 still defines a code consisting of the single character "5". However, unlike the arrangement 50, the arrangement 52 reveals very little concerning aspects of the code.

Figure 8:
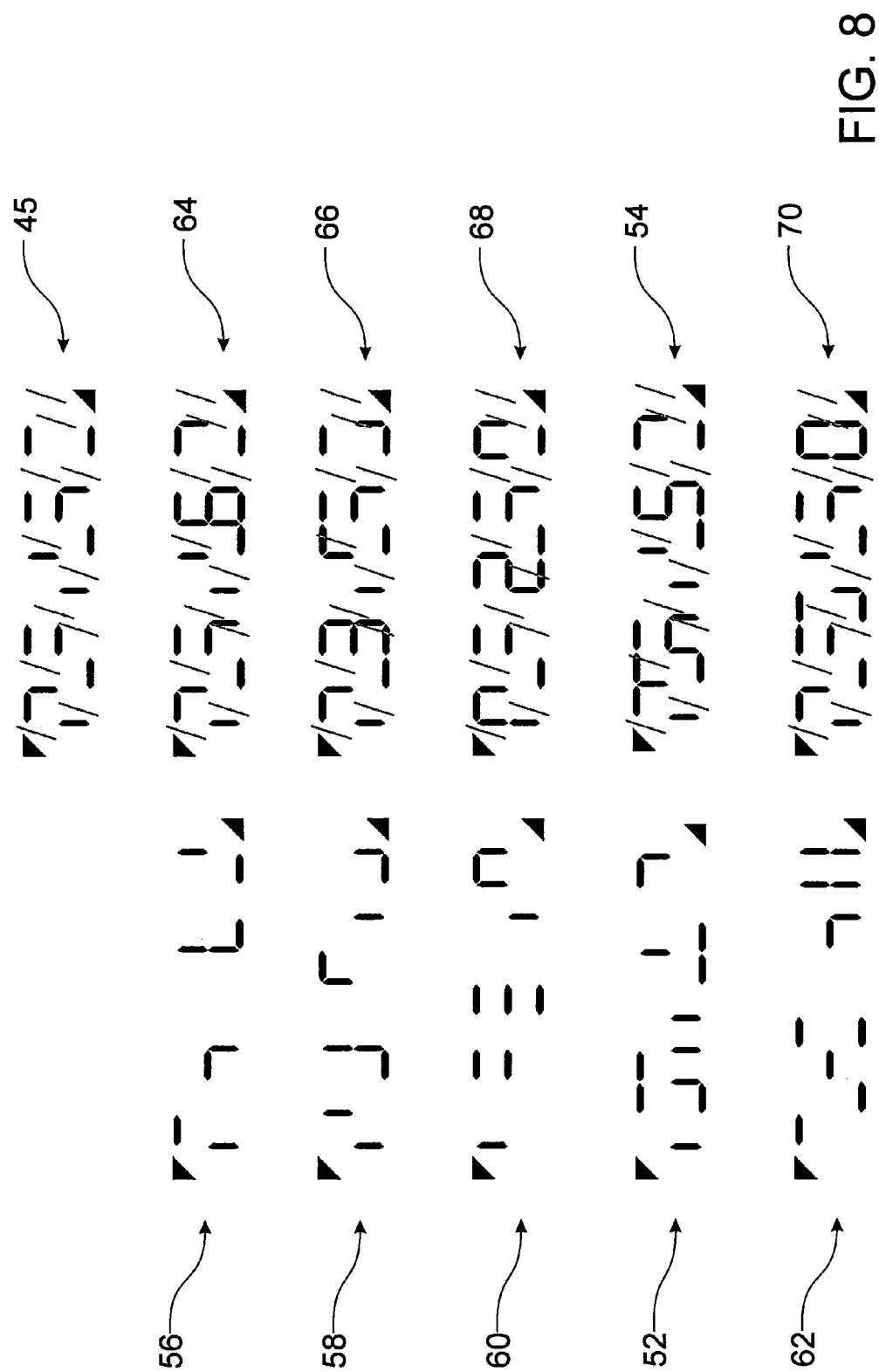
FIG. 8 is a diagram illustrating the generation of an "animated key challenge", according to some embodiments of the present invention.

Referring to FIG. 8, a diagram illustrates the generation of an "animated key challenge", according to some embodiments of the present invention. For example, consider that the arrangement 45 is printed on the transparent window 23 of the plastic identification card 20 to define a static elongated segment pattern 21. If the card 20 is then placed against an electronic display screen such as a computer screen, a series of challenge patterns in the form of arrangements 56, 58, 60, 52, 62 can then define a dynamic series of synchronized elongated segment patterns 22. A user looking at the transparent window 23 against the computer screen will then see, in sequence, first an arrangement 64, then an arrangement 66, then an arrangement 68, then the arrangement 54, then an arrangement 70. For example, the arrangement 56 can be displayed for a period of three seconds, then the arrangement 58 can be displayed for a period of three seconds, etc. The user then will be able to see each character in sequence of a code consisting of characters "63250", where the "6" is revealed by the arrangement 64, the "3" is revealed by the arrangement 66, etc.

Further, by causing the arrangements 56, 58, 60, 52, 62 to be repeatedly displayed in a sequential loop (resulting in the code "632506325063250 . . . ", etc.), a user is under no time pressure to read the code. Also, by using a loop, a user can begin the code at any character. Thus an acceptable response to such an automated key challenge could be any one of the codes "63250", "32506", "25063", "50632", "63250", or "06325". Although some security is lost by accepting more than one code as a correct "answer" to the automated challenge patterns, in some circumstances that may be greatly outweighed by increased "user friendliness" and by an overall increase in security gained from the use of multiple challenge patterns in the form of the arrangements 56, 58, 60, 52, 62.

Figure 9:
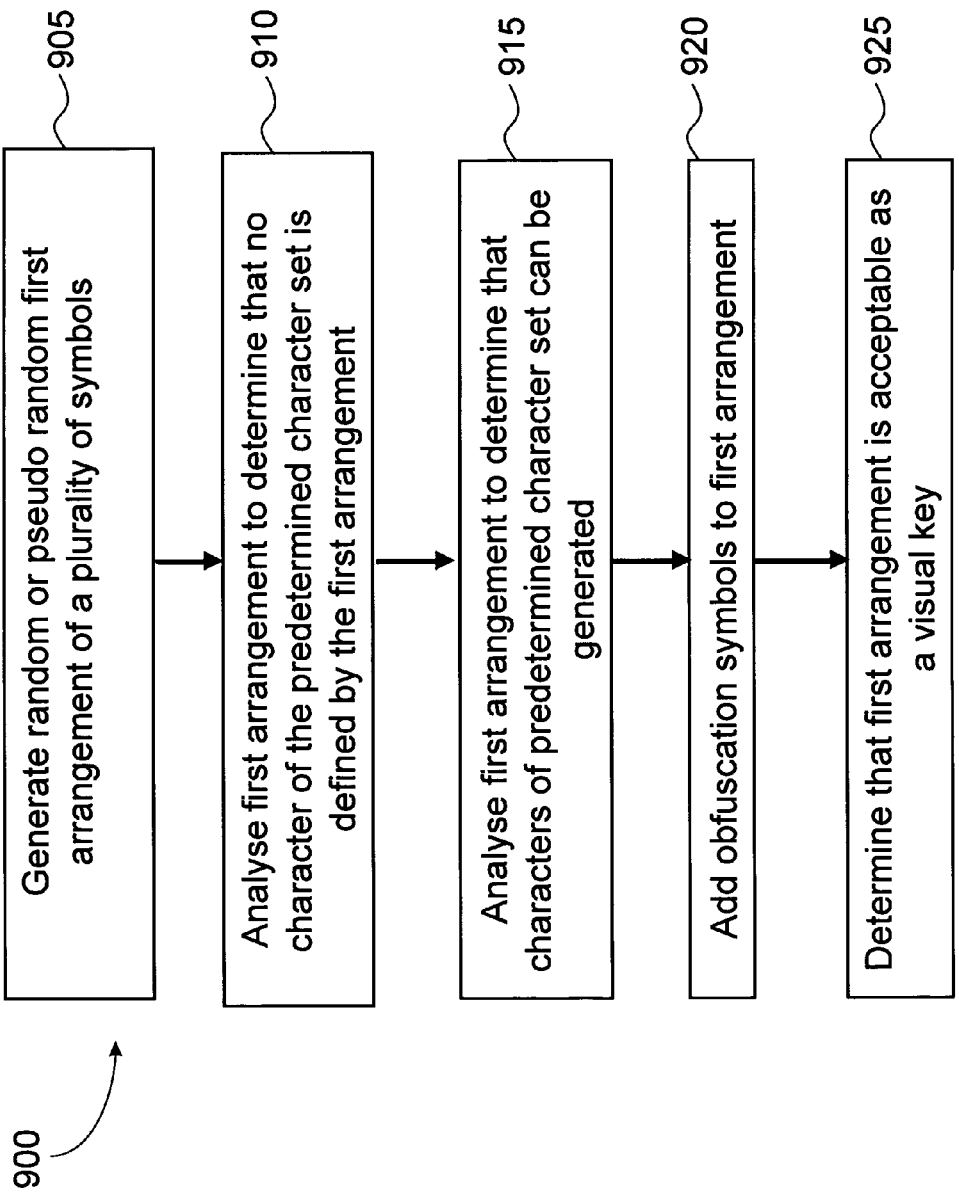
FIG. 9 is a general flow diagram illustrating a method for generating a visual key, according to some embodiments of the present invention.

Referring to FIG. 9, a general flow diagram illustrates a method 900 for generating a visual key, according to some embodiments of the present invention. At step 905 a random or pseudo random first arrangement of a plurality of symbols is generated.

At step 910, an analysis is conducted of the first arrangement to determine that no character of a predetermined character set is defined by the first arrangement.

At step 915, an analysis is conducted of the first arrangement to determine that characters of the predetermined character set can be generated when the first arrangement is aligned with a second arrangement of a plurality of the symbols.

At step 920, obfuscation symbols are added to the first arrangement to increase the cryptographic effectiveness of the visual key.

Finally, at step 925, based on the above analyses, it is determined that the first arrangement is acceptable as a visual key.

An embodiment of software on a server is described below as a set of computer readable program components that cooperate to control the performance of operations of data processing when loaded and executed on the server. It will be apparent to a person skilled in the art that the individual steps of methods of the present invention can be implemented in computer program code and that a variety of programming languages and coding implementations may be used to implement the methods described herein. Moreover, computer programs included in the software are not intended to be limited to the specific control flows described herein, and one or more of the steps of the computer programs may be performed in parallel or sequentially. One or more of the operations described in the context of a computer-program-controlled implementation could alternatively be implemented as a hardware electronics component.

Figure 10:
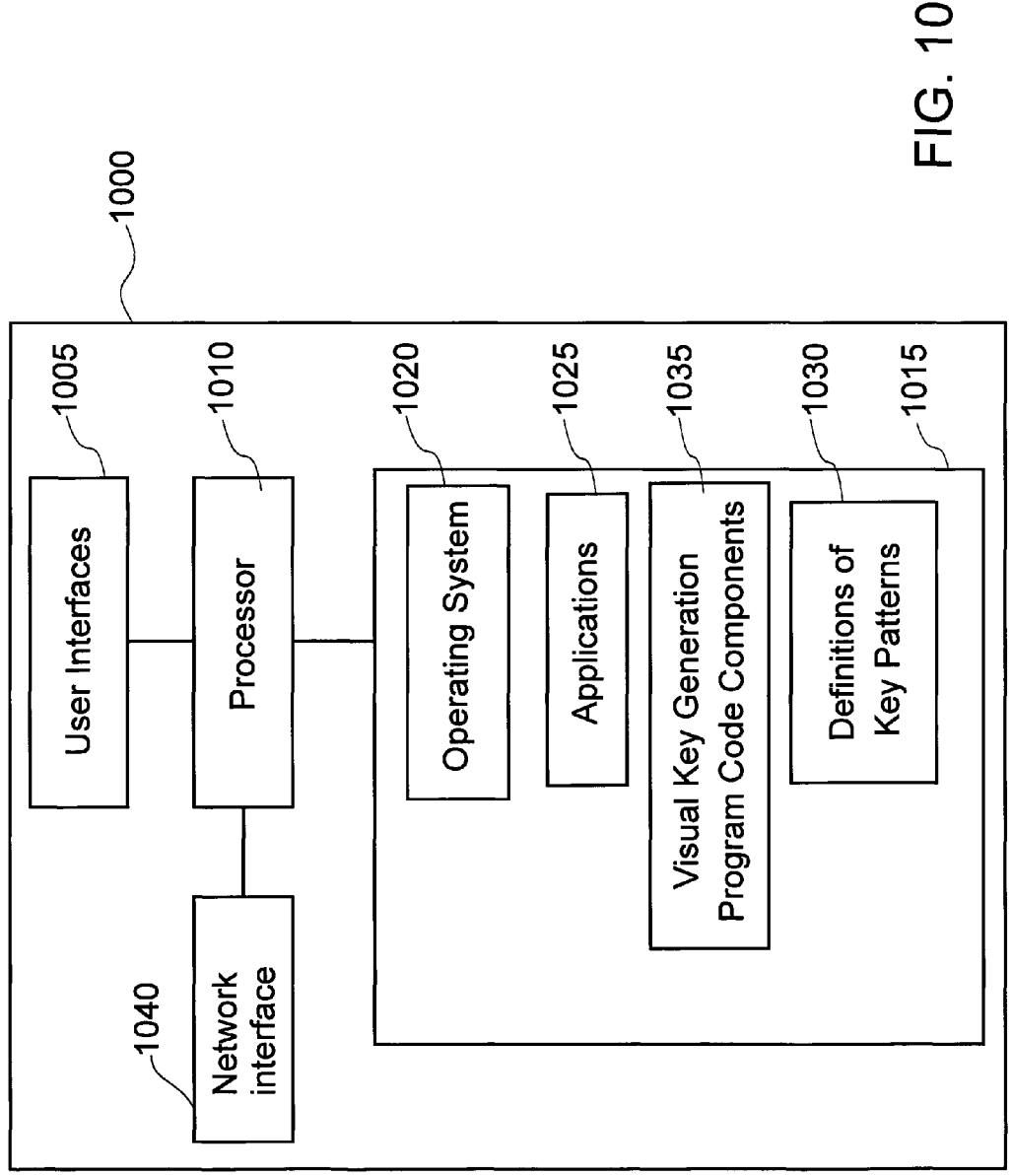
FIG. 10 is a block diagram illustrating components of a system in the form of a server for generating a visual key, according to some embodiments of the present invention.

Referring to FIG. 10, a block diagram illustrates components of a system in the form of a server 1000 for generating a visual key, according to some embodiments of the present invention. The server 1000 comprises user interfaces 1005 operatively coupled to at least one processor 1010. A memory 1015 is also operatively coupled to the processor 1010. The memory 1015 stores an operating system 1020, applications 1025 and definitions of key patterns 1030. The user interfaces 1005 can be a combination of user interfaces including, for example, but not limited to a keypad and a graphical user interface (GUI) such as a computer display screen. A network interface card 1040 enables the server 1000 to be operatively coupled to an electronic communication network such as the Internet. It is to be understood that FIG. 10 is for illustrative purposes only and includes only some components of the server 1000, in accordance with some embodiments of the present invention, and is not intended to be a complete schematic diagram of the various components and connections between components required for all devices that may implement various embodiments of the present invention.

The memory 1015 also includes computer readable program code components 1035 concerning generating a visual key. For example, when the computer readable program code components 1035 are processed by the processor 1010, the components 1035 are configured to cause execution of the method 900 for generating a visual key, as described above, according to some embodiments of the present invention.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

Limitations in the claims should be interpreted broadly based on the language used in the claims, and such limitations should not be limited to specific examples described herein. In this specification, the terminology "present invention" is used as a reference to one or more aspects within the present disclosure. The terminology "present invention" should not be improperly interpreted as an identification of critical elements, should not be improperly interpreted as applying to all aspects and embodiments, and should not be improperly interpreted as limiting the scope of the claims.

The invention claimed is:

1. A method for generating a visual key, the method comprising:
   generating a random or pseudo random first arrangement of a plurality of symbols;
   conducting an analysis of the random or pseudo random first arrangement to determine that no character of a predetermined character set is defined by the random or pseudo random first arrangement;
   conducting an analysis of the random or pseudo random first arrangement to determine that characters of the predetermined character set can be generated when the random or pseudo random first arrangement is aligned with a second arrangement of the plurality of the symbols; and
   determining, based on the above analyses, that the random or pseudo random first arrangement is acceptable as a visual key.

2. The method of claim 1, wherein the plurality of symbols comprises a plurality of identical symbols.

3. The method of claim 1, wherein the plurality of the symbols comprise elongated segments.

4. The method of claim 1, wherein the random or pseudo random first arrangement of the plurality of symbols is printed on a transparent window of a card, the second arrangement of the plurality of symbols is displayed on an electronic display screen, and aligning the random or pseudo random first arrangement with the second arrangement comprises superimposing the random or pseudo random first arrangement over the second arrangement.

5. The method of claim 1, wherein the random or pseudo random first arrangement is displayed on an electronic display screen, the second arrangement of the plurality of symbols is printed on a transparent window of a card, and aligning the random or pseudo random first arrangement with the second arrangement comprises superimposing the second arrangement over the random or pseudo random first arrangement.

6. The method of claim 1, wherein conducting an analysis of the random or pseudo random first arrangement to determine that characters of the predetermined character set can be generated comprises conducting an analysis of the random or pseudo random first arrangement to determine that all characters of the predetermined character set can be generated.

7. The method of claim 1, wherein conducting an analysis of the random or pseudo random first arrangement to determine that characters of the predetermined character set can be generated comprises conducting an analysis of the random or pseudo random first arrangement to determine that a subset of characters of the predetermined character set can be generated.

8. The method of claim 1, wherein the predetermined character set is an alphanumeric character set.

9. The method of claim 1, wherein generating the random or pseudo random first arrangement of the plurality of symbols comprises including a number, within a predetermined range, of symbols to satisfy a predetermined pattern density range.

10. The method of claim 1, further comprising adding obfuscation symbols to the random or pseudo random first arrangement to increase the cryptographic effectiveness of the visual key.

11. A computer server for generating a visual key, comprising:
 a processor; and
 a memory operatively coupled to the processor, wherein the memory comprises:
  computer readable program code components for generating a random or pseudo random first arrangement of a plurality of symbols;
  computer readable program code components for conducting an analysis of the random or pseudo random first arrangement to determine that no character of a predetermined character set is defined by the random or pseudo random first arrangement;
  computer readable program code components for conducting an analysis of the random or pseudo random first arrangement to determine that characters of the predetermined character set can be generated when the random or pseudo random first arrangement is aligned with a second arrangement of a plurality of the symbols; and
  computer readable program code components for determining, based on the above analyses, that the random or pseudo random first arrangement is acceptable as a visual key.

12. The computer server of claim 11, wherein the plurality of the symbols comprises a plurality of identical symbols.

13. The computer server of claim 11, wherein the plurality of the symbols comprise elongated segments.

14. The computer server of claim 11, wherein the random or pseudo random first arrangement of the plurality of the symbols is to be printed on a transparent window of a card, the second arrangement of the plurality of symbols is to be displayed on an electronic display screen, and aligning the random or pseudo random first arrangement with the second arrangement comprises superimposing the random or pseudo random first arrangement over the second arrangement.

15. The computer server of claim 11, wherein the random or pseudo random first arrangement is to be displayed on an electronic display screen, the second arrangement of the plurality of symbols is to be printed on a transparent window of a card, and aligning the random or pseudo random first arrangement with the second arrangement comprises superimposing the second arrangement over the random or pseudo random first arrangement.

16. The computer server of claim 11, wherein conducting an analysis of the random or pseudo random first arrangement to determine that characters of the predetermined character set can be generated comprises conducting an analysis of the random or pseudo random or first arrangement to determine that all characters of the predetermined character set can be generated.

17. The computer server of claim 11, wherein conducting an analysis of the random or pseudo random first arrangement to determine that characters of the predetermined character set can be generated comprises conducting an analysis of the random or pseudo random first arrangement to determine that a subset of characters of the predetermined character set can be generated.

18. The computer server of claim 11, wherein the predetermined character set is an alphanumeric character set.

19. The computer server of claim 11, wherein generating the random or pseudo random first arrangement of the plurality of symbols comprises including a number, within a predetermined range, of symbols to satisfy a predetermined pattern density range.

20. The computer server of claim 11, wherein the memory further comprises computer readable program code components for adding obfuscation symbols to the random or pseudo random first arrangement to increase the cryptographic effectiveness of the visual key.

* * * * *